United States Patent
Curie et al.

(10) Patent No.: US 6,677,013 B1
(45) Date of Patent: Jan. 13, 2004

(54) TRANSPARENT MULTILAYER POLYPROPYLENE CONTAINER WITH BARRIER PROTECTION

(75) Inventors: Kevin James Curie, Appleton, WI (US); Randolph Lee Davidson, Menasha, WI (US); Sahin Emre, Appleton, WI (US)

(73) Assignee: Pechiney Emballage Flexible Europe

( * ) Notice: Subject to any disclaimer, the term of this patent is extended or adjusted under 35 U.S.C. 154(b) by 0 days.

(21) Appl. No.: 09/293,401

(22) Filed: Apr. 16, 1999

Related U.S. Application Data
(60) Provisional application No. 60/082,118, filed on Apr. 17, 1998.

(51) Int. Cl.[7] .................. B65D 23/00; B32B 27/00
(52) U.S. Cl. ............... 428/35.7; 428/36.6; 428/36.7; 428/476.1; 428/476.9; 215/12.2
(58) Field of Search .............. 428/36.6, 36.7, 428/475.5, 475.8, 476.1, 476.3, 476.9, 477.4, 521, 35.7; 215/12.2, 13.1

(56) References Cited

U.S. PATENT DOCUMENTS

| | | | |
|---|---|---|---|
| 2,927,106 A | 3/1960 | Hepp et al. |
| 2,928,756 A | 3/1960 | Campbell |
| 2,929,807 A | 3/1960 | Leatherman et al. |
| 2,930,726 A | 3/1960 | Jones et al. |
| 2,930,788 A | 3/1960 | Banks |
| 2,936,303 A | 5/1960 | Goins |
| 2,944,049 A | 7/1960 | Edmonds, Jr. |
| 2,962,490 A | 11/1960 | Edmonds, Jr. et al. |
| 2,969,348 A | 1/1961 | Fawcett |
| 2,969,408 A | 1/1961 | Nowlin et al. |
| 2,970,991 A | 2/1961 | Cines |
| 2,972,604 A | 2/1961 | Reynolds et al. |
| 2,973,088 A | 2/1961 | Canterino |
| 2,973,241 A | 2/1961 | Scott, Jr. et al. |
| 2,997,456 A | 8/1961 | Mills |
| 3,001,968 A | 9/1961 | Canterino et al. |
| 3,005,793 A | 10/1961 | Wagner |
| 3,007,902 A | 11/1961 | Nelson |
| 3,007,905 A | 11/1961 | Bailey |
| 3,013,820 A | 12/1961 | Pouppirt |
| 3,023,180 A | 2/1962 | Canterino et al. |
| 3,023,198 A | 2/1962 | Nowlin et al. |
| 3,024,227 A | 3/1962 | Nowlin et al. |
| 3,035,953 A | 5/1962 | Arnold |
| 3,049,529 A | 8/1962 | Wicklatz et al. |

(List continued on next page.)

FOREIGN PATENT DOCUMENTS

| | | |
|---|---|---|
| EP | 0 407 880 | 5/1999 |
| WO | WO 94/23941 | 10/1994 |
| WO | WO 96/05110 | 2/1996 |
| WO | WO 00/63085 | 10/2000 |

OTHER PUBLICATIONS

Product Information: Fusabond® polymers modifiers, Fusabond® Product Line, DuPont Industrial Polymers website, Oct. 30, 2000.

S.M.B. Nachtigall, R. Baumhardtneto and R.S. Mauler, "A Factorial Design Applied to Polypropylene Functionalization With Maleic Anhydride", *Polymer Engineering and Science*, vol. 39, No. 4, pp. 630–637 (1999).

(List continued on next page.)

*Primary Examiner*—Kenneth R. Rice
(74) *Attorney, Agent, or Firm*—McDermott, Will & Emery

(57) ABSTRACT

A multilayer plastic container comprises a layer of a polypropylene and a layer of EVOH directly adjacent the layer of polypropylene wherein at least one of the polypropylene and EVOH layers comprises an adhesive such as maleic anhydride concentrate mixed therein to adhere the layer of polypropylene to the layer of EVOH.

52 Claims, 1 Drawing Sheet

U.S. PATENT DOCUMENTS

| Patent | Kind | Date | Inventor | Ref |
|---|---|---|---|---|
| 3,050,510 | A | 8/1962 | Canterino et al. | |
| 3,050,513 | A | 8/1962 | Zelinski et al. | |
| 3,051,288 | A | 8/1962 | Borodin | |
| 3,051,692 | A | 8/1962 | Lyons | |
| 3,067,184 | A | 12/1962 | Cines | |
| 3,074,616 | A | 1/1963 | Martinovich et al. | |
| 3,075,026 | A | 1/1963 | Banks | |
| 3,076,776 | A | 2/1963 | Findlay | |
| 3,084,149 | A | 4/1963 | Stevens et al. | |
| 3,086,957 | A | 4/1963 | Carter | |
| 3,086,958 | A | 4/1963 | Canterino et al. | |
| 3,098,062 | A | 7/1963 | Hogan | |
| 3,099,639 | A | 7/1963 | Cobb et al. | |
| 3,101,327 | A | 8/1963 | Lyons | |
| 3,101,328 | A | 8/1963 | Edmonds, Jr. | |
| 3,102,876 | A | 9/1963 | Hogan | |
| 3,108,094 | A | 10/1963 | Morgan | |
| 3,108,324 | A | 10/1963 | Zavasnik | |
| 3,118,857 | A | 1/1964 | Carr | |
| 3,119,798 | A | 1/1964 | Moberly et al. | |
| 3,119,801 | A | 1/1964 | Haskell | |
| 3,120,506 | A | 2/1964 | Carr | |
| 3,123,583 | A | 3/1964 | Howard et al. | |
| 3,124,622 | A | 3/1964 | Cywinski | |
| 3,127,370 | A | 3/1964 | Head | |
| 3,130,188 | A | 4/1964 | Hogan | |
| 3,147,239 | A | 9/1964 | Canterino et al. | |
| 3,157,564 | A | 11/1964 | Tucker et al. | |
| 3,165,504 | A | 1/1965 | Hogan | |
| 3,172,872 | A | 3/1965 | Kraus et al. | |
| 3,174,957 | A | 3/1965 | Hall | |
| 3,176,347 | A | 4/1965 | Shaul | |
| 3,177,188 | A | 4/1965 | Ray et al. | |
| 3,177,193 | A | 4/1965 | Scott, Jr. | |
| 3,182,049 | A | 5/1965 | Moberly | |
| 3,183,221 | A | 5/1965 | Axe et al. | |
| 3,188,258 | A | 6/1965 | Young | |
| 3,208,982 | A | 9/1965 | Davis | |
| 3,210,332 | A | 10/1965 | Lyons et al. | |
| 3,210,910 | A | 10/1965 | Seefluth | |
| 3,211,635 | A | 10/1965 | Cywinski | |
| 3,213,071 | A | 10/1965 | Campbell | |
| 3,215,682 | A | 11/1965 | Farrar et al. | |
| 3,218,224 | A | 11/1965 | Osborn | |
| 3,219,649 | A | 11/1965 | Nowlin et al. | |
| 3,223,694 | A | 12/1965 | Farrar, Jr. | |
| 3,228,896 | A | 1/1966 | Canterino et al. | |
| 3,231,650 | A | 1/1966 | Findlay et al. | |
| 3,232,920 | A | 2/1966 | Naylor | |
| 3,245,975 | A | 4/1966 | Zelinski | |
| 3,258,456 | A | 6/1966 | Nelson | |
| 3,280,092 | A | 10/1966 | Edmonds, Jr. | |
| 3,285,889 | A | 11/1966 | Arnold | |
| 3,287,342 | A | 11/1966 | Walton | |
| 3,288,773 | A | 11/1966 | Harban et al. | |
| 3,294,868 | A | 12/1966 | Pritchard | |
| 3,299,016 | A | 1/1967 | Sonnenfeld | |
| 3,299,186 | A | 1/1967 | Wallace | |
| 3,303,239 | A | 2/1967 | Cleary et al. | |
| 3,304,281 | A | 2/1967 | Tucker | |
| 3,308,073 | A | 3/1967 | Kepple | |
| 3,310,505 | A | 3/1967 | Parker | |
| 3,313,786 | A | 4/1967 | Kahle et al. | |
| 3,313,794 | A | 4/1967 | Cleary | |
| 3,317,502 | A | 5/1967 | Harban et al. | |
| 3,318,721 | A | 5/1967 | Lineburg | |
| 3,332,921 | A | 7/1967 | Cleary | |
| 3,332,928 | A | 7/1967 | Farrar | |
| 3,336,280 | A | 8/1967 | Naylor | |
| 3,345,431 | A | 10/1967 | Harban | |
| 3,347,955 | A | 10/1967 | Renaudo | |
| 3,347,966 | A | 10/1967 | Seefluth | |
| 3,354,138 | A | 11/1967 | Burr | |
| 3,354,235 | A | 11/1967 | Hogan et al. | |
| 3,358,506 | A | 12/1967 | Renaudo | |
| 3,372,140 | A | 3/1968 | Witt | |
| 3,402,216 | A | 9/1968 | Hutson, Jr. | |
| 3,403,072 | A | 9/1968 | Wheat | |
| 3,404,104 | A | 10/1968 | Hill et al. | |
| 3,409,495 | A | 11/1968 | Rasmussen | |
| 3,412,188 | A | 11/1968 | Seefluth | |
| 3,415,710 | A | 12/1968 | Arnold | |
| 3,429,862 | A | 2/1969 | Fodor | |
| 3,436,380 | A | 4/1969 | Davison | |
| 3,439,380 | A | 4/1969 | Seefluth | |
| 3,444,153 | A | 5/1969 | Fodor | |
| 3,445,367 | A | 5/1969 | Kallenbach | |
| 3,445,543 | A | 5/1969 | Gruver | |
| 3,452,120 | A | 6/1969 | Arnold | |
| 3,454,545 | A | 7/1969 | Scoggin | |
| 3,454,675 | A | 7/1969 | Scoggin | |
| 3,457,322 | A | 7/1969 | Wentz, Jr. | |
| 3,475,517 | A | 10/1969 | Renaudo | |
| 3,485,890 | A | 12/1969 | Dixon | |
| 3,489,729 | A | 1/1970 | Kahle et al. | |
| 3,513,152 | A | 5/1970 | Hogan | |
| 3,525,123 | A | 8/1970 | Cines et al. | |
| 3,531,553 | A | 9/1970 | Bodkins | |
| 3,536,797 | A | 10/1970 | Cowan et al. | |
| 3,538,565 | A | 11/1970 | Simpson et al. | |
| 3,544,518 | A | 12/1970 | Bodkins et al. | |
| 3,546,312 | A | 12/1970 | Heckelsberg et al. | |
| 3,554,961 | A | 1/1971 | Moon | |
| 3,565,853 | A | 2/1971 | Moon | |
| 3,579,478 | A | 5/1971 | Dunn et al. | |
| 3,579,602 | A | 5/1971 | Reusser | |
| 3,586,731 | A | 6/1971 | Heckelsberg | |
| 3,590,095 | A | 6/1971 | Zeuch | |
| 3,600,371 | A | 8/1971 | Marwil | |
| 3,600,487 | A | 8/1971 | Zavasnik | 264/89 |
| 3,607,987 | A | 9/1971 | Walton et al. | |
| 3,620,435 | A | 11/1971 | Sogi | 229/3.5 R |
| 3,627,869 | A | 12/1971 | Walton | |
| 3,761,550 | A | 9/1973 | Seefluth | |
| 3,770,408 | A | 11/1973 | McCully | |
| 3,878,033 | A | 4/1975 | Zavasnik | |
| 3,882,259 | A | 5/1975 | Nohara et al. | 428/36.7 |
| 3,893,957 | A | 7/1975 | Mixon et al. | |
| 3,932,692 | A | 1/1976 | Hirata et al. | 428/339 |
| 3,950,459 | A | 4/1976 | Seefluth | |
| 4,198,327 | A * | 4/1980 | Matsumoto et al. | 260/4 |
| 4,254,169 | A * | 3/1981 | Schroeder | 428/36.6 |
| 4,405,667 | A | 9/1983 | Christensen et al. | 428/35 |
| 4,407,897 | A | 10/1983 | Farrell et al. | 428/516 |
| 4,451,512 | A | 5/1984 | Yazaki et al. | 428/36 |
| 4,464,328 | A | 8/1984 | Yoshino et al. | |
| 4,501,779 | A | 2/1985 | Hsu et al. | 428/35 |
| 4,501,797 | A | 2/1985 | Super et al. | 428/349 |
| 4,511,610 | A | 4/1985 | Yazaki et al. | 428/35 |
| 4,526,821 | A | 7/1985 | McHenry et al. | |
| 4,552,714 | A | 11/1985 | Krueger et al. | 264/171 |
| 4,619,849 | A | 10/1986 | Anzawa et al. | |
| 4,701,360 | A | 10/1987 | Gibbons et al. | |
| 4,705,708 | A | 11/1987 | Briggs et al. | 428/35 |
| 4,741,936 | A | 5/1988 | Nohara et al. | 428/35 |
| 4,803,102 | A | 2/1989 | Raniere et al. | 428/35.2 |
| 4,846,656 | A | 7/1989 | Denis et al. | |
| 4,861,526 | A | 8/1989 | Gibbons et al. | |
| 4,894,267 | A | 1/1990 | Bettle, III et al. | 428/36.7 |
| 4,923,395 | A | 5/1990 | Coxhead et al. | |
| 4,950,510 | A | 8/1990 | Massouda | |

| | | |
|---|---|---|
| 4,977,004 A | 12/1990 | Bettle, III et al. ......... 428/36.7 |
| 4,981,906 A * | 1/1991 | Tomono et al. ............... 525/66 |
| 4,990,382 A | 2/1991 | Weissenstein et al. ...... 428/35.7 |
| 5,035,851 A | 7/1991 | Schirmer |
| 5,035,933 A * | 7/1991 | Ilenda et al. ............... 428/36.6 |
| 5,068,077 A * | 11/1991 | Negi et al. ................... 264/512 |
| 5,085,822 A | 2/1992 | Uehara et al. |
| 5,129,815 A | 7/1992 | Miyazawa et al. |
| 5,133,999 A | 7/1992 | Löfgren et al. |
| 5,175,036 A | 12/1992 | Smiley et al. |
| 5,183,706 A | 2/1993 | Bekele |
| 5,202,192 A * | 4/1993 | Hope et al. ............... 428/475.8 |
| 5,238,718 A * | 8/1993 | Yano et al. ................ 428/35.7 |
| 5,281,670 A * | 1/1994 | Lee et al. ................... 524/528 |
| 5,314,987 A * | 5/1994 | Kim et al. .................. 528/289 |
| 5,320,889 A | 6/1994 | Bettle, III .................. 428/36.6 |
| 5,324,528 A | 6/1994 | Wright et al. |
| 5,360,670 A | 11/1994 | Yonezu et al. ............... 428/412 |
| H1419 H * | 2/1995 | Wilpers et al. ............. 525/240 |
| 5,399,619 A | 3/1995 | Torradas et al. ............... 525/57 |
| 5,459,218 A | 10/1995 | Palackal et al. |
| 5,487,940 A | 1/1996 | Bianchini et al. |
| 5,512,338 A | 4/1996 | Bianchini et al. |
| 5,616,353 A | 4/1997 | Wright et al. |
| 5,631,030 A | 5/1997 | Brun, Jr. et al. |
| 5,635,226 A | 6/1997 | Koda et al. |
| 5,730,919 A | 3/1998 | Wilfong et al. |
| 5,874,115 A | 2/1999 | Dobler |
| 6,037,022 A | 3/2000 | Adur et al. |
| 6,037,063 A | 3/2000 | Muschiatti et al. |
| 6,042,906 A | 3/2000 | Itoh et al. |
| 6,110,548 A | 8/2000 | Kinsey |
| 6,136,354 A | 10/2000 | Wood et al. |
| 6,139,790 A | 10/2000 | Bogen et al. |
| 6,239,210 B1 * | 5/2001 | Kim et al. .................. 524/538 |
| 6,248,413 B1 | 6/2001 | Barel et al. |

OTHER PUBLICATIONS

Yuji Sawada, Hiromi Shigemoto, Haruhiko Tanaka, "Advanced Adhesive Resins Achieved With Metallocene Technology", Mitsui Chemicals, Inc., handout at Future–Pak '99.
S. Sanchez–Valdes, F. Orona–Villarreal, M. Lopez–Quintanilla, I. Yanez–Flores and L.F. Ramos De Valle, "Performance of Multilayer Films Using Maleated Linear Low–Density Polyethylene Blends", *Polymer Engineering and Science*, vol. 38, No. 1, pp. 150–155 (1998).
"What We Make, Maliec Anhydride (MAN)", BP Amoco Chemicals Products website, printed Feb. 15, 2000.
W.H. Gardner and L.H. Flett, "Maliec Acid, Fumeric Acid, and Maleic Anhydride", *Encyclopedia of Chemical Technology*, Third Edition, vol. 14, pp. 770–793 (1982).
Bo Pan, K. Viswanathan, C.E. Hoyle, R. Redfearn and R.B. Moore, "Photografting of Maleic Anhydride Onto Hydrocarbons: A Model Study On the Grafting Mechanism", *Polymer Preprints 2001*, 42(2), pp. 278–279.
Chapter 16, p. 482, Source unknown (date unknown).
Shucai Li, Pentti K. Jarvela and Pirkko A. Jarvela, "A Comparison Between Apparent Viscosity and Dynamic Complex Viscosity for Polypropylene/Maleated Polypropylene Blends", *Polymer Engineering and Science*, vol. 37, No. 1, pp. 18–23 (1997).
Darilyn H. Roberts, Robert C. Constable and Seshan Thiruvengada, "Advances in Maleated Polyolefins for Plastics Applications", *Polymer Engineering and Science*, vol. 37, No. 8, pp. 1421–1426 (1997).
Sidel, Wave Lengths Frequencies Composition Applications Of The Electromagnetic Spectrum, (date unknown).

A. Derdouri, R. Connolly and R. Khayat, "Material Constants Identification for Thermoforming Simulation", *ANTEC '98*, pp. 672–674.
D. Laroche and F. Erchiqui, "Experimental and Theoretical Study Of The Thermoformability of Industrial Polymers", *ANTEC '98*, pp. 676–680.
Tameka Spence and Donald Hylton, "Rheological Studies of Commercial Thermoforming Materials", *ANTEC '98*, pp. 681–689.
Plastics World, "Orientd Polypropylene: Strong New Contender Enters the Bottle Race", pp. 56–58 (1970).
Plastics Engineering, "Beloit takes the wraps off its latest biaxial blow molder", pp. 40–41 (1975).
Volker Rauschenberger, "Predicting The Processability of BOPP (Biaxially Oriented Polypropylene) Material For Film Applications On Laboratory Scale", *ANTEC '98*, pp. 150–154.
Ashish M. Sukhadia, "The Effects Of Molecular Structure, Rheology, Morphology and Orientation On Polyethylene Blown Film Properties", *ANTEC '98*, pp. 160–168.
Nathalie Legros, Akbar Ghaneh–Fard, Kenneth C. Cole, Abdellah Ajji and Michel M. Dumoulin, "Tensile Properties And Orientation Evolution With Processing Conditions In Polyethylene Blown Films", *ANTEC '98*, pp. 169–173.
S. Piccarolo, "Recovery Of Uniaxially Oriented Polypropylene", pp. 443–450 (date unknown).
Arindam Datta, Jianguo J. Zhou, J. Jenny Yuan and Andrea Monisera, "The Effects of Annealing Conditions on the Structure and Properties of Polypropylene Fibers", *Medical Plastics and Biomaterials* Magazine, from devicelink.com/mpb/archive (1997).
Francesco Briatico–Vangosa and Marta Rink, "Deformational Behavior of Polyolefins at High Temperature and Strain Rate: Experimental Analysis and Constitutive Laws", *Polymer Engineering and Science*, vol. 40, No. 7, pp. 1553–1563 (2000).
Phillip T. DeLassus and Nicole F. Whiteman, "Physical and Mechanical Properties of Some Important Polymers", *Polymer Handbook*, 4th ed., pp. 159–169 (date unknown).
Ethylene Polymers, vol. 6, *Encyclopedia of Polymer Science and Engineering*, vol. 6, pp. 420–423 (date unknown).
Dec. 19, 1997 computer search results listing titles and abstracts of citations numbered: 1–2 from *Energy Science and Technology*; 3 from *Engineering Index*; 4 from *Engineered Matrials Abstracts*; 5 from *Mechanical Engineering*; 6–8 from *Materials Business*; 9 from U.S. Patent Bibliographic Database; 10–20 from *Paper and Board Printing and Packaging*; 21 from *Packaging Science & Tech. Abstracts*; and 22–53 from *Rubber & Plastics Research Abstracts*.
Dec. 19, 1997 computer search results listing titles and abstracts of citations numbered: 1 from *Engineering Index*; 2–9 from *Paper and Board Printing and Packaging*; 10–17 from *Rubber & Plastic Research Abstracts*.
Dec. 19, 1997 computer search results listing titles and abstracts of citations numbered: 1–4 from *Paper and Board Printing and Packaging*; and 5–8 from *Rubber & Plastics Research Abstracts*.
Thomas R. Mueller, "Improving Barrier Properties of Polypropylene Films", *Journal of Plastic Film & Sheeting*, vol. 14, pp. 226–233 (1988).
William W. Cox and Edward K. Bullock, "Draw Stress Characterization of Polypropylene For Improved Biaxial Film Processability", pp 397–415 (date unknown).

M.E. Gross and C.D. Weber, "Carboxylic Polymers In Adhesives", *Handbook of Adhesives,* 2 ed., pp. 331–342.

S. Sanchez–Valdes, I. Yanez–Flores, L.F. Ramos De Valle, O.S. Rodriguez–Fernandez, F. Orona–Villarreal and M. Lopez–Quintanilla, "Fusion Bonding of Maleated Polyethylene Blends to Polamide 6", *Polymer Engineering and Science,* vol. 38, No. 1, pp. 127–133 (1998).

DeBell & Richardson, Inc., "Status And Prospects Of Plastic Bottles In Food And Beverage Packaging", pp. 63–64 (1971).

Scott M. Hacker, "Not all Maleated Polyolefins are Created Equal", ANTEC '01 handout.

N. Walling and M.R. Kamal, "Phase Morphology and Properties of Injection Molded Polypropylene/Ethylene Vinyl Alcohol Copolymer Blends", *Advances In Polymer Technology,* vol. 5, No. 4, 269–288 (1996).

Dr. H. Heyn, Bekum Maschinenfabriken GmbH, "PP Processing in 2 Phase Injection Stretch Blow Moulding for Packaging", Polypropylene'94, Oct. 4–5, 1994, Zurich, Switzerland.

H. Heyn, Berlin, The Two–Stage Injection Stretch Blow–Moulding Process, Kunststoffe plast europe, 10/94, pp. 2–4.

* cited by examiner

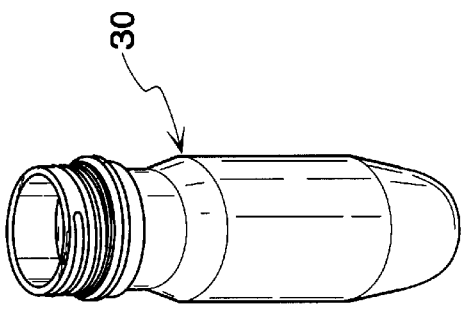
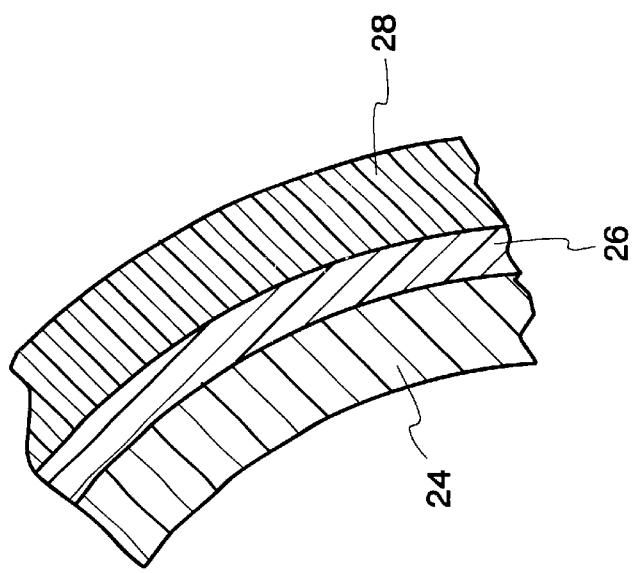
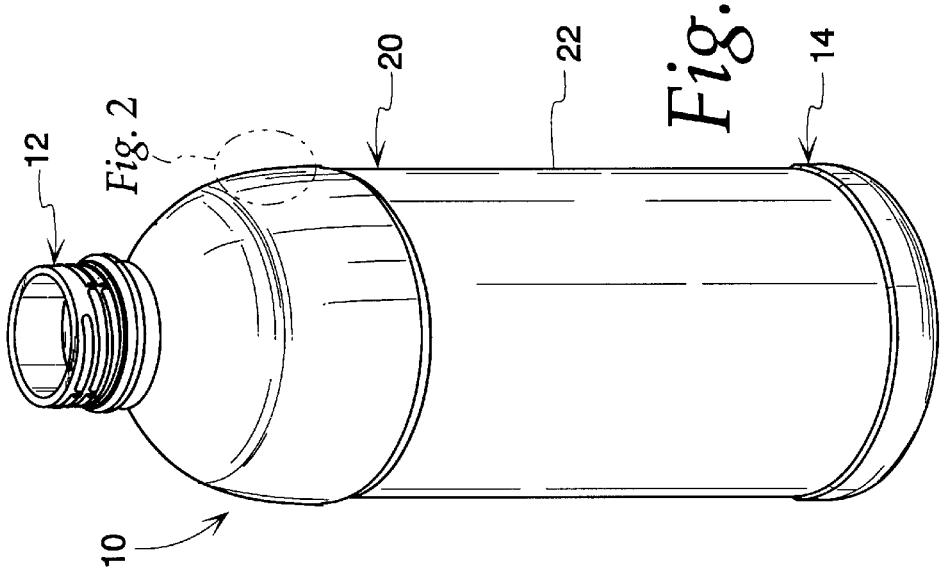

TRANSPARENT MULTILAYER POLYPROPYLENE CONTAINER WITH BARRIER PROTECTION

This application claims the priority of U.S. provisional patent application Ser. No. 60/082,118 filed on Apr. 17, 1998, the entirety of which is incorporated herein by reference.

BACKGROUND OF THE INVENTION

1. Field of the Invention

This invention relates generally to transparent multilayer containers; specifically, to transparent multilayer containers having a layer of polypropylene and a layer of a barrier material which provides oxygen, carbon dioxide and moisture protection.

2. Background Art

Many products that can be filled and stored in plastic containers require carbon dioxide, oxygen and moisture barrier protection to keep the products fresh for extended periods of time. Such products include, by way of example only, certain carbonated beverages, fruit juices, beer, sauces, ketchup, jams, jellies and dry foods such as instant coffee and spices. Most commercially acceptable transparent multilayer containers that provide carbon dioxide and oxygen barrier protection are made of at least one layer comprising a polyester such as polyethylene terephthalate ("PET") and a layer comprising ethylene vinyl alcohol copolymer ("EVOH"). The layer of EVOH in such containers provides excellent carbon dioxide and oxygen barrier protection. EVOH can also act as a chemical or fragrance barrier to keep flavors fresh for various products such as orange juice.

PET has limited moisture barrier protection compared with polypropylene. As a result, liquid products stored in PET containers experience moisture loss resulting in product weight loss and dry products stored in PET containers absorb more moisture than products stored in polypropylene containers. In addition, PET bottles have limited hot fill capabilities due to a low glass transition temperature of PET. Additionally, the injection molding process temperatures of PET and EVOH are significantly different thus creating difficulties in molding these two materials together in, for instance, multi-layer injection molding systems.

It is known to use polypropylene, instead of PET, for an inner and outer layer of multi-layer containers in extrusion blow molding applications. One advantage of polypropylene over PET is that polypropylene provides containers with better hot fill properties. Furthermore, polypropylene and EVOH have relatively similar melting temperatures, which makes it easier to maintain proper injection molding or extrusion molding systems.

Unfortunately, however, polypropylene does not bond to EVOH without the assistance of an additional agent. As a result, known containers made with polypropylene and EVOH require a layer of an adhesive between each layer of polypropylene and the layer of EVOH. Accordingly, multilayer polypropylene containers with carbon dioxide and oxygen barrier protection have typically had at least five layers of material: a first layer of polypropylene, a first layer of adhesive, a layer of EVOH, a second layer of adhesive and a second layer of polypropylene.

Additionally, known polypropylene containers with barrier protection have haze values of approximately 29%–35% or greater. While it is known to injection stretch blow mold containers with a single layer of clarified polypropylene to make a transparent bottle having lower haze values, such containers do not have many commercial purposes for food applications because they do not provide significant carbon dioxide or oxygen barrier protection.

SUMMARY OF THE INVENTION

The transparent containers of the present invention have a layer comprising polypropylene and a layer comprising a barrier material such as ethylene vinyl alcohol copolymer, nylon or a blend of ethylene vinyl alcohol copolymer and nylon, adjacent to the polypropylene layer wherein at least one of the polypropylene layer and the barrier layer comprises an adhesive mixed therein.

It is one of the principal objectives of the present invention to provide multilayer plastic containers that also provide oxygen, carbon dioxide and moisture barrier protection having a haze value of less than 25%.

It is another object of the present invention to provide containers having a layer of a polypropylene/adhesive mixture and a layer of barrier material directly adjacent the layer of polypropylene/adhesive mixture.

It is another object of the present invention to provide containers having a layer of a polypropylene and a layer of barrier material/adhesive mixture directly adjacent the layer of polypropylene.

It is another object of the present invention to provide commercially acceptable, cost effective containers having a layer comprising polypropylene and a layer comprising a barrier material adjacent to the polypropylene layer, wherein the containers may be used for carbonated beverages, fruit juices, sauces and beer.

It is still another object of the present invention to provide a polypropylene bottle having at least two layers and having a haze value of less than 25%.

It is further an object of the present invention to use two different materials with similar melting temperature to provide more compatible injection molding systems.

BRIEF DESCRIPTION OF DRAWINGS

FIG. 1 is a perspective view of a multilayer container according to the present invention.

FIG. 2 is a sectional view of a wall of the container shown in FIG. 1.

FIG. 3 is a perspective view of a preform according to the present invention that is used to make a multilayer container.

DETAILED DESCRIPTION OF THE DRAWINGS

Referring now to FIG. 1, there is shown a transparent, multilayer plastic container, specifically a bottle 10, according to the teaching of the present invention. The bottle 10 has a top end 12 and a bottom end 14. A body portion 20 extends between the top end 12 and the bottom end 14 and forms a cylindrical wall 22. Although the container illustrated is a bottle, it is noted that various other containers can be made according to the present invention as well.

As best illustrated in the cross-sectional view of the cylindrical wall 22 shown in FIG. 2, the bottle 10 is preferably constructed of three layers, namely an inner layer 24, a middle layer 26 and an outer layer 28. Both the inner layer 24 and the outer layer 28, which are structural layers, are made of a material comprising at least polypropylene. The polypropylene can be a homopolymer or a copolymer. The comonomer can be selected from the group consisting of ethylene, butylene, or other alpha-olefins from $C_5$–$C_8$. A preferred comonomer is ethylene wherein the ethylene is up to 3.0 weight % of the polypropylene copolymer. The polypropylene may also contain additives such as clarifying agents. Clarifying agents are exemplified by: Milliken Chemical, Division of Milliken & Co.'s Millad 3988 clarifying agent or Mitsui Toatsu Chemicals, Inc.'s NC4 clarifying agent. Other clarifiers such as sorbitol and benzoates can also be used. Such clarifying agents typically comprises 0.1–0.3% by weight of the polypropylene. The middle layer 26 is preferably made of a material comprising at least an ethylene vinyl alcohol copolymer (EVOH). The middle layer 26 of EVOH provides carbon dioxide and oxygen barrier resistance that allows a product to be stored within the bottle 10 for an extended period of time without spoiling. Note that while the middle layer 26 is preferably made of a material comprising EVOH, the middle layer can comprise any appropriate barrier material, such as nylon or a blend of ethylene vinyl alcohol copolymer and nylon as well without departing from the present invention. An appropriate nylon is exemplified by MXD6, nylon 6 and nylon 6/66. An appropriate adhesive (discussed in detail below) is chosen dependant upon the material of the middle layer 26 to bond the inner and outer layers 24, 28 thereto.

The inner and outer layers 24, 28 are the structural layers of the bottle and provide additional moisture barrier protection for the product to be contained in the bottle 10. The thickness of the inner and outer layers 24, 28 and the thickness of the middle layer 26 are determined by factors such as the type of product to be filled in the container, the desired shelf life of the product, etc. Typically the thickness of the layers are in the range of between approximately 5 mils to 10 mils for each of the inner and outer layers 24, 28 and between approximately 0.1 mils to 2.0 mils for the middle layer 26.

The bottle 10 can be stretch blow molded from a preform 30 (FIG. 3), by using conventional stretch blow molding techniques. In one embodiment, the preform 30 is made by an injection molding process such as the injection molding processes described in U.S. Pat. Nos. 4,511,528 and 4,712,990, which are hereby incorporated by reference. Alternatively, the bottle may be made by extrusion blow molding techniques such as the process described in U.S. Pat. No. 5,156,857, which is hereby incorporated by reference.

With regard to injection molding applications, the process temperatures of polypropylene and EVOH are approximately the same. Therefore, the process temperatures of the materials to comprise the inner and outer layers 24, 28 and the materials to comprise the middle layer 26 are also approximately the same despite the addition of an adhesive (discussed in detail below) to at least one of the inner and outer layers 24, 28 and the middle layer 26. Accordingly, it is easier to maintain proper flow temperatures for the material forming each layer 24, 26, 28 and, therefore, control the flows of these layers having only two different materials as opposed to controlling five layers of three distinct materials (i.e., polypropylene, adhesive and EVOH) which may have different process temperatures. The process temperature of the polypropylene and EVOH is approximately between 180°–235° C. (with or without the adhesive discussed in detail below). It is specifically contemplated, however, that the present invention may be accomplished with material other than the preferred polypropylene and EVOH.

In order to bond each of the inner and outer layers 24, 28 to the middle layer 26, the material of at least one of the inner and outer layers 24, 28 and the middle layer 26 comprises an adhesive mixed therein. Thus, in a first embodiment of the present invention, the inner and outer layers 24, 28 may comprise a mixture of polypropylene and an adhesive ("polypropylene/adhesive mixture") while the middle layer 26 is comprised of EVOH without an added adhesive. Examples of this first embodiment are provided below.

In a second embodiment, the middle layer 26 may be made of a material comprised of EVOH and an adhesive ("EVOH/adhesive mixture") while the inner and outer layers 24, 28 are comprised of a polypropylene without an added adhesive. Examples of this second embodiment are provided below.

In a third embodiment, the inner and outer layers 24, 28 are made of the polypropylene/adhesive mixture and the middle layer is made of the EVOH/adhesive mixture.

Sufficient adhesion for purposes of this invention means achieving a bond between the middle layer 26 and each of the inner and outer layers 24, 28 to prevent delamination during forming of the bottle 10 or other container and withstanding normal package handling and distribution. For some applications, sufficient adhesion would also mean a sufficient bond between the layers to withstand hot filling of the container at temperatures of 190°–210° F. The amount of adhesive used must also provide sufficient adhesion for purposes of injection molding the preform and stretch blow molding the container from the preform. Importantly, using the lowest possible percentage of adhesive is desirable because the adhesive is relatively expensive compared to polypropylene and EVOH.

It has been found that the greater the percentage of adhesive evenly distributed within any layer of the bottle 10 (referred to herein as a "mixed-adhesive layer"), the better that layer will adhere to an adjacent layer. This correlation is due to two facts. First, the adhesive force that a mixed-adhesive layer may exert on an adjacent layer of a container depends, at least in part, upon the amount of adhesive available at the outer surface of that mixed-adhesive layer. Second, as the percentage of adhesive agent evenly mixed and distributed throughout any composite material used to construct a mixed-adhesive layer is increased, the amount of adhesive agent which will be exposed at an outer surface of that mixed-adhesive layer (and thereby made available for adhesion to an adjacent layer) will also necessarily increase. Additionally, the percentage of the adhesive agent in the mixed-adhesive layer, which is exposed at the outer surface of that mixed-adhesive layer, is inversely proportional to the thickness of that mixed-adhesive layer. That is, a thinner mixed-adhesive layer will produce greater adhesive potential from a given quantity of adhesive agent, than will a relatively thicker mixed-adhesive layer comprised of the same given quantity of adhesive agent.

From the foregoing it will be understood that because the middle layer 26 of the present invention is thinner (preferably between 0.1 and 2.0 mils) than each of the outer layers 24, 28 (preferably between 5 mils and 10 mils), mixing an adhesive into the middle layer 26, as in the second preferred embodiment of the present invention, will necessarily decrease the amount of adhesive necessary to bond the inner and outer layers 24, 28 to the middle layer 26 relative to the first embodiment of the present invention in which the adhesive is dispersed within the inner and outer layers 24, 28. Moreover, because the second embodiment of the present invention only requires adhesive to be mixed into a single layer rather than into two layers (as required by the first embodiment of the present invention described above), the total quantity of adhesive required for the second embodiment is further reduced relative to the quantity of adhesive required for the first embodiment. Regardless of which embodiment of the present invention is employed, however, the amount of adhesive required to acquire the requisite bonding of the middle layer 26 to both the inner and outer layers 24, 28 is reduced relative to prior methods of bonding polypropylene to EVOH which place an entire layer of adhesive between each of the inner and outer layers 24, 28 and the middle layer 26. Moreover, as discussed above, the complexity of molding preforms to achieve such bonding is likewise reduced by elimination of the adhesive layers.

In one embodiment of the present invention, bottles are made having a haze value of less than approximately 29%. In another embodiment, the bottles have a haze value of 10–12%. A haze value is defined as the percent of total light which, in passing through the specimen, deviates through forward scatter by more than 0.044 rad (2.5°) on the average. The preferred test to obtain the haze value of the bottle is ASTM Method D-1003 as defined in the 1995 Annual Book of ASTM Standards, Volume 8.01.

First Embodiment

The adhesive used to make the polypropylene/adhesive mixture for the first embodiment of the present invention is a maleic anhydride modified polypropylene. The amount of adhesive that must be blended into the polypropylene depends on the maleic anhydride concentration of the adhesive. Enough adhesive must be added such that the resulting polypropylene/adhesive mixture has a maleic anhydride content of approximately 0.01%–0.20% by weight of the total mixture. (For example: 10% of adhesive containing 0.15% maleic anhydride.) The polypropylene/adhesive mixture can contain between 0–98% by weight polypropylene and between 2–100% by weight adhesive. It has been found that the greater the percentage of adhesive used, the better the layer of EVOH will adhere to the structural layer. However, it has been found that sufficient adhesion between the layers is achieved using polypropylene/adhesive mixtures containing as low as approximately 0.01%–0.015% maleic anhydride. The middle layer 26, as provided by the prescripts of first embodiment, is comprised of EVOH without the presence of an adhesive therein.

The following are examples of the first embodiment of the present invention:

EXAMPLE 1

A three-layer coinjection molded preform was made having inner and outer structural layers 24 and 28 which are made from a polypropylene/adhesive mixture containing about 85% polypropylene and 15% adhesive and a middle layer 26 of EVOH. The polypropylene was Solvay 4285. The adhesive was Morton EFM-2E02. The EVOH selected for the middle layer 26 was Evalca LCE-105A (having a 44% ethylene content). The preform was then stretch blow molded to form a transparent container having a haze value of approximately 10–12% measured through a section of the bottle having a thickness of approximately 15–20 mils.

EXAMPLE 2

A multilayer coinjection molded preform was made as in Example 1 except that the percentages of polypropylene and adhesive in the inner and outer layers 24 and 28 were 90% polypropylene and 10% adhesive. The preform was stretch blow molded to form a transparent container having a haze value of approximately between 10–12% measured through a section of the container having a thickness of approximately 15–20 mils.

EXAMPLE 3

A three-layer container was made by a coextrusion blow molding process. The layers were extruded together to form a tube. The tube was blow molded in a mold to form the container. The layers 24 and 28 were made from a polypropylene/adhesive mixture containing about 90% polypropylene and 10% adhesive. The polypropylene was Montell SR256M. The adhesive is Morton EFM-2E02. The EVOH selected for the middle layer 26 was Evalca LCE-105A.

EXAMPLE 4

A multilayer coinjection molded preform was made as in Example 1 except that the EVOH used was Evalca LCF-104AW (having a 32% ethylene content). The preform was then stretch blow molded to form a transparent container.

EXAMPLE 5

A multilayer coinjection molded preform was made as in Example 1 except that the EVOH used was Evalca LCL 101A (having a 27% ethylene content). The preform was then stretch blow molded to form a transparent container.

EXAMPLE 6

A multilayer coinjection molded preform was made as in Example 1 except that the EVOH used was Nippon Gohsei Soarnol DC3203. The preform was then stretch blow molded to form a transparent container.

EXAMPLE 7

A multilayer coinjection molded preform was made as in Example 1 except that the barrier was nylon, specifically Mitsubishi's MXD6-6121 nylon. The preform was then stretch blow molded to form a transparent container.

EXAMPLE 8

A multilayer coinjection molded preform was made as in Example 1 except that the polypropylene was Fina 7426MZ. The preform was then stretch blow molded to form a transparent container.

EXAMPLE 9

A multilayer coinjection molded preform was made as in Example 1 except that the polypropylene was Montell SR256M. The preform was then stretch blow molded to form a transparent container.

EXAMPLE 10

A multilayer coinjection molded preform was made as in Example 1 except that the polypropylene/adhesive mixture layer was 100% Mitsui Admer QB510A. The preform was then stretch blow molded to form a transparent container.

The bottles made in Examples 1–10 of the first embodiment above are transparent, exhibit good strength and provide excellent carbon dioxide, oxygen and moisture barrier protection. The bottles can also withstand being hot filled.

Second Embodiment

The EVOH/adhesive mixture used for the middle layer 26 of the second embodiment was comprised of Evalca XEP403 resin. The inner and outer layers 24, 28 are comprised of polypropylene without the presence of a maleic anhydride therein.

The following are examples of the second embodiment of the present invention:

EXAMPLE 1

A three-layer coinjection molded preform was made having inner and outer structural layers 24 and 28 made from 100% polypropylene. The polypropylene was Solvay 4285. The middle layer 26 was made from 100% Evalca XEP403 resin. The preform was then stretch blow molded to form a transparent container.

EXAMPLE 2

A multilayer coinjection molded preform was made as in Example 1 of the second embodiment except that the polypropylene used for the inner and outer structural layers 24 and 28 was Fina 7426MZ and the middle layer 26 was comprised of Evalca XEP403 having 100 ppm of Cobalt. The preform was then stretch blow molded to form a transparent container.

The bottles made in Examples 1 and 2 of the second embodiment are transparent, exhibit good strength and provide carbon dioxide, oxygen and moisture barrier protection.

From the foregoing description, it will be apparent that the transparent multilayer polypropylene containers having a barrier layer of the present invention have a number of advantages, some of which have been described above and others of which are inherent in the transparent multilayer polypropylene containers of the present invention. Also, it will be understood that modifications can be made to the transparent multilayer polypropylene containers having a barrier layer of the present invention without departing from the teachings of the invention. Accordingly the scope of the invention is only to be limited as necessitated by the accompanying claims.

We claim:

1. A multilayer container comprising:
    a first layer defining an outermost layer of the container and comprising polypropylene in a mixture with maleic anhydride modified propylene, wherein said first layer comprises about 0.01 to about 0.20 percent by weight maleic anhydride; and
    a second layer comprising a material selected from the group consisting of EVOH and nylon, directly adjacent to the first layer;
    the maleic anhydride facilitating bonding between the first layer and the second layer, said first layer constituting a structural layer.

2. The container of claim 1 wherein the first layer contains approximately 0.015% maleic anhydride.

3. The container of claim 1 wherein the container has a haze value of less than approximately 29% measured through a section of the container having a total thickness of greater than approximately 15 mils.

4. The container of claim 3 wherein the container has a haze value of approximately 10%–12% measured through a section of the container having a total thickness of greater than approximately 15 mils.

5. The container of claim 1 wherein the second layer comprises EVOH.

6. The container of claim 1 wherein the second layer comprise the condensation polymer of meta-xylylene diamine and adipic acid.

7. The container of claim 1 wherein the second layer comprises nylon 6.

8. The container of claim 1 wherein the second layer comprises nylon 6/66.

9. The container of claim 1 further comprising a third layer comprised of polypropylene and maleic anhydride, said third layer defining an innermost layer of the container.

10. The container of claim 1 further comprising a third layer comprised of polypropylene, directly adjacent to the second layer.

11. The container of claim 10, the third layer further comprising maleic anhydride.

12. The container of claim 10, the third layer defining an innermost layer of the container.

13. The container of claim 1, the second layer comprising nylon and 100 ppm of cobalt.

14. A multilayer container comprising:
    a first layer defining an outermost layer of the container and comprising polypropylene in a mixture with maleic anhydride modified polypropylene wherein said first layer comprises about 0.01 to about 0.20 percent by weight maleic anhydride; and
    a second layer comprising a material selected from the group consisting of EVOH and nylon, directly adjacent to the first layer;
    the maleic anhydride facilitating bonding between the first layer and the second layer.

15. The container of claim 14 wherein the first layer contains approximately 0.015% maleic anhydride.

16. The container of claim 14 wherein the container has a haze value of less than approximately 29% measured through a section of the container having a total thickness of greater than 15 mils.

17. The container of claim 16 wherein the container has a haze value of approximately 10%–12% measured through a section of the container having a total thickness of greater than approximately 15 mils.

18. The container of claim 14 wherein the second layer comprises EVOH.

19. The container of claim 14 wherein the second layer comprises the condensation polymer of meta-xylylene diamine and adipic acid.

20. The container of claim 14 wherein the second layer comprises nylon 6.

21. The container of claim 14 wherein the second layer comprises nylon 6/66.

22. The container of claim 14, the second layer comprising nylon and 100 ppm of cobalt.

23. The container of claim 14 further comprising a third layer comprised of polypropylene and maleic anhydride, said third layer defining an innermost layer of the container.

24. The container of claim 14 further comprising a third layer comprised of polypropylene, directly adjacent to the second layer.

25. The container of claim 24, the third layer further comprising maleic anhydride.

26. The container of claim 24, the third layer defining an innermost layer of the container.

27. A multilayer container comprising:
    a first layer defining an innermost layer of the container and comprising polypropylene in a mixture with maleic anhydride modified polypropylene wherein said first layer comprises about 0.01 to about 0.20 percent by weight maleic anhydride; and
    a second layer comprising,a material selected from the group consisting of EVOH and nylon, directly adjacent to the first layer;

the maleic anhydride facilitating bonding between the first layer and the second layer, said first layer constituting a structural layer.

28. The container of claim 27 wherein the first layer contains approximately 0.015% maleic anhydride.

29. The container of claim 27 wherein the container has a haze value of less than approximately 29% measured through a section of the container having a total thickness of greater than approximately 15 mils.

30. The container of claim 29 wherein the container has a haze value of approximately 10%–12% measured through a section of the container having a total thickness of greater than approximately 15 mils.

31. The container of claim 27 wherein the second layer comprises EVOH.

32. The container of claim 27 wherein the second layer comprises the condensation polymer of meta-xylylene diamine and adipic.

33. The container of claim 27 wherein the second layer comprises nylon 6.

34. The container of claim 27 wherein the second layer comprises nylon 6/66.

35. The container of claim 27 further comprising a third layer comprised of polypropylene and maleic anhydride, said third layer defining an innermost layer of the container.

36. The container of claim 27 further comprising a third layer comprised of polypropylene, directly adjacent to the second layer.

37. The container of claim 35, the third layer further comprising maleic anhydride.

38. The container of claim 35, the third layer defining an innermost layer of the container.

39. The container of claim 27, the second layer comprising nylon and 100 ppm of cobalt.

40. A multilayer container comprising:

a first layer defining an innermost layer of the container and comprising polypropylene in a mixture with maleic anhydride modified polypropylene wherein said first layer comprises about 0.01 to about 0.20 percent by weight maleic anhydride; and a second layer comprising a material selected from the group consisting of EVOH and nylon, directly adjacent to the first layer;

the maleic anhydride facilitating bonding between the first layer and the second layer.

41. The container of claim 40 wherein the first layer contains approximately 0.015% maleic anhydride.

42. The container of claim 40 wherein the container has a haze value of less than approximately 29% measured through a section of the container having a total thickness of treater than approximately 15 mils.

43. The container of claim 42 wherein the container has a haze value of approximately 10%–12% measured through a section of the container having a total thickness of greater than approximately 15 mils.

44. The container of claim 40 wherein the second layer comprises EVOH.

45. The container of claim 40 wherein the second layer comprises the condensation polymer of meta-xylylene diamine and adipic.

46. The container of claim 40 wherein the second layer comprises nylon 6.

47. The container of claim 40 wherein the second layer comprises nylon 6/66.

48. The container of claim 40, the second layer comprising nylon and 100 ppm of cobalt.

49. The container of claim 40 further comprising a third layer comprised of polypropylene and maleic anhydride, said third layer defining an outermost layer of the container.

50. The container of claim 40 further comprising a third layer comprised of polypropylene, directly adjacent to the second layer.

51. The container of claim 50, the third layer further comprising maleic anhydride.

52. The container of claim 50, the third layer defining an outermost layer of the container.

* * * * *